(12) United States Patent
Kennedy et al.

(10) Patent No.: US 7,950,057 B1
(45) Date of Patent: May 24, 2011

(54) DRIVER LOAD MANAGER AND METHOD

(75) Inventors: Mark Kennedy, Redondo Beach, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 1188 days.

(21) Appl. No.: 11/614,758

(22) Filed: Dec. 21, 2006

(51) Int. Cl.
*G06F 11/00* (2006.01)
(52) U.S. Cl. ............ 726/22; 726/26; 713/193; 711/152; 711/153; 711/206
(58) Field of Classification Search ........................ None
See application file for complete search history.

(56) References Cited

U.S. PATENT DOCUMENTS

| | | | |
|---|---|---|---|
| 2003/0200485 A1* | 10/2003 | Achtelstetter | 714/37 |
| 2004/0030876 A1* | 2/2004 | Qureshi et al. | 713/1 |
| 2005/0114639 A1* | 5/2005 | Zimmer | 712/244 |
| 2008/0127344 A1* | 5/2008 | Sallam | 726/23 |

OTHER PUBLICATIONS

Vijayan, "Security Firms Wait for Microsoft's PatchGuard Response", pp. 1-2 [online]. Retrieved on Dec. 14, 2006 from the Internet: <URL:http://computerworld.co.nz/news.nsf/printer/32DBF7C33ADC8196CC25720B006D0E82>.

Turnure, "The Advantages of Running Applications on Windows Vista", pp. 1-19 [online]. Retrieved on Dec. 14, 2006 from the Internet: <URL:http://msdn2.microsoft.com/en-us/library/bb188739 (d=printer).aspx>.

"MmGetSystemRoutineAddress", p. 1 [online]. Retrieved on Dec. 14, 2006 from the Internet: <URL:http://msdn.microsoft.com/library/default.asp?url=/library/en-us/Kernel_r/hh/Kernel_r/k106_4cd56243-e8f4-428a-95f2-4e7a1d2a7396.xml.asp>. No author provided.

"Intel® 64 and IA-32 Architectures Software Developer's Manual", vol. 3A: System Programming Guide, Part 1, § 4.8.7.1, pp. 4-31 to 4-32 [online], Oct. 2006. Retrieved from the Internet: <URL:ftp://download.intel.com/design/ Pentium4/manuals/25366821.pdf section 4.8.7.1>. No author provided.

Buches, U.S. Appl. No. 11/234,478, filed Sep. 22, 2005, entitled "Fast System Call Hooking on X86-64-bit Windows XP Platforms".

* cited by examiner

*Primary Examiner* — Nasser Moazzami
*Assistant Examiner* — Fikremariam Yalew
(74) *Attorney, Agent, or Firm* — Gunnison, McKay & Hodgson, L.L.P.; Philip McKay

(57) ABSTRACT

A method includes determining that a driver load address is in a system service dispatch table (SSDT) addressable area. The method further includes determining whether the driver is authorized to be in the SSDT addressable area. If the driver is authorized to be in the SSDT addressable area, the driver is loaded in the SSDT addressable area and is able to hook operating system functions. Conversely, if the driver is not authorized to be in the SSDT addressable area, the driver is loaded outside the SSDT addressable area and is not able to hook operating system functions. In this manner, only authorized drivers are allowed to hook operating system functions.

12 Claims, 3 Drawing Sheets

DRIVER LOAD MANAGER AND METHOD

BACKGROUND OF THE INVENTION

1. Field of the Invention

The present invention relates to the protection of computer systems. More particularly, the present invention relates to a system and method for loading drivers.

2. Description of the Related Art

The operating system's kernel offers the most fundamental and therefore important operating system services. The fundamental nature of these services also makes the services such powerful tools that whatever controls the services can ultimately control everything else on the system. Failure or compromise of such powerful and fundamental services can be catastrophic, so it is logical and important to implement a kernel protection scheme.

PatchGuard is Microsoft's kernel protection scheme for 64-bit platforms. Microsoft has taken the approach of blanket denial of access to kernel structures by non-Microsoft kernel code. However, malware and security products both use System Service Dispatch Table (SSDT) hooks to wield the fundamental power of the operating system services. Such "blind justice" as blanket denial of kernel access to security products and malware writers alike is overkill.

What is needed is a kernel protection scheme that protects against unauthorized modifications to the system service dispatch table but which also allows access by legitimate security vendors necessary to continue innovating and providing alternative security models to compliment those of the underlying operating system.

SUMMARY OF THE INVENTION

A method includes determining a 64-bit driver load address of a driver being loaded. The method further includes determining whether the driver load address is in a system service dispatch table (SSDT) addressable area. Upon a determination that the driver load address is in the SSDT addressable area, the method further includes determining whether the driver is authorized to be in the SSDT addressable area. If the driver is authorized to be in the SSDT addressable area, the driver is allowed to load.

In this event, the driver will be loaded in the SSDT addressable area. Accordingly, the driver will be addressable by a system service dispatch table, and thus can hook operating system functions using the system service dispatch table. However, as the driver is authorized to be in the SSDT addressable area, loading of the driver in the SSDT addressable area has been certified or otherwise authorized.

Conversely, if the driver is not authorized to be in the SSDT addressable area, the method includes taking protective action. Illustratively, the driver is loaded in a SSDT non-addressable area. In this manner, the driver will not be addressable by the system service dispatch table, and thus cannot hook operating system functions using the system service dispatch table. Accordingly, the integrity of the operating system code and other kernel address space code and data structures are protected from the driver, e.g., an errant, malicious or otherwise unauthorized program.

Embodiments in accordance with the present invention are best understood by reference to the following detailed description when read in conjunction with the accompanying drawings.

BRIEF DESCRIPTION OF THE DRAWING

Common reference numerals are used throughout the drawings and detailed description to indicate like elements.

DETAILED DESCRIPTION

Figure 1:
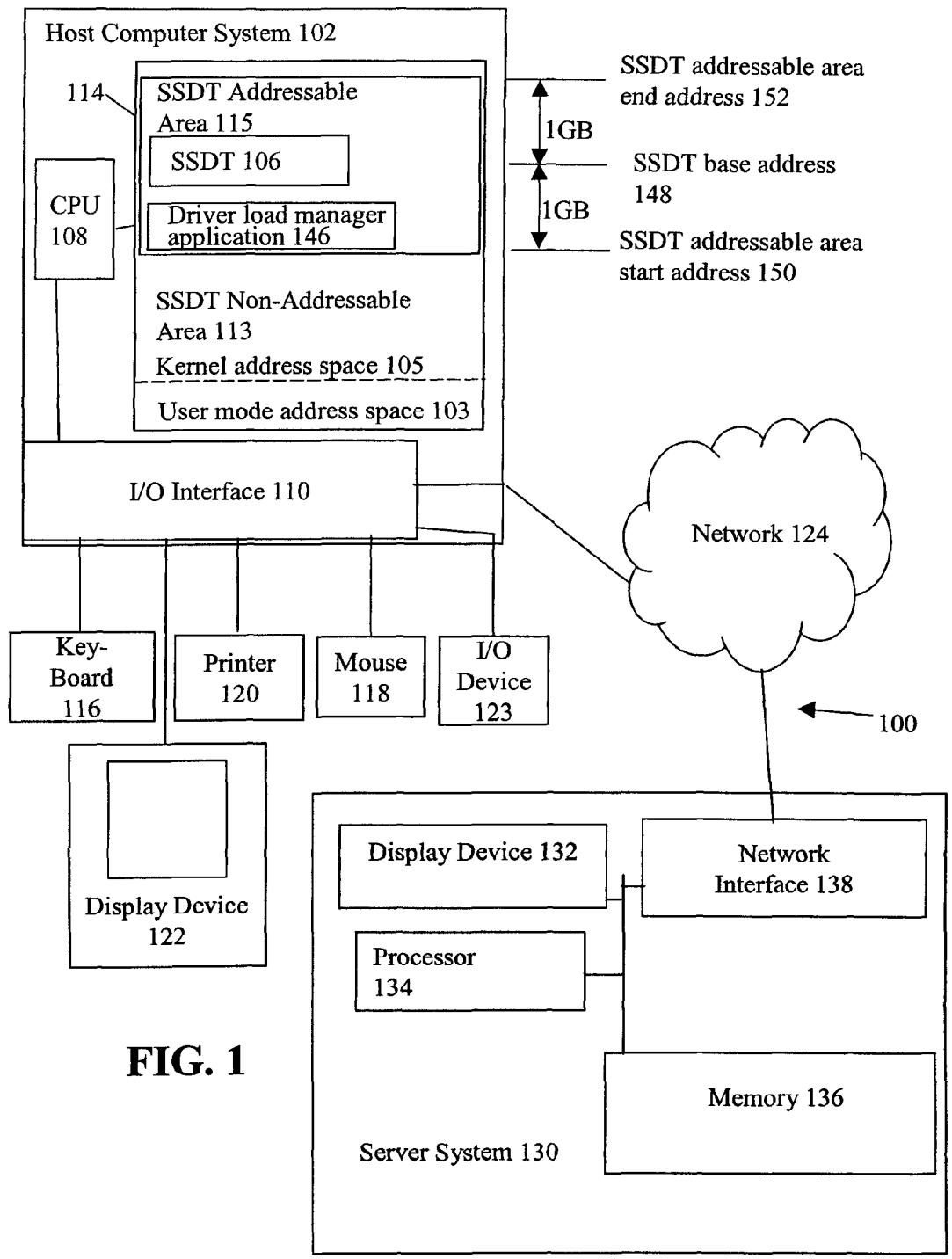
FIG. 1 is a diagram of a client-server system that includes a driver load manager application executing on a host computer system in accordance with one embodiment of the present invention.
Figure 3:
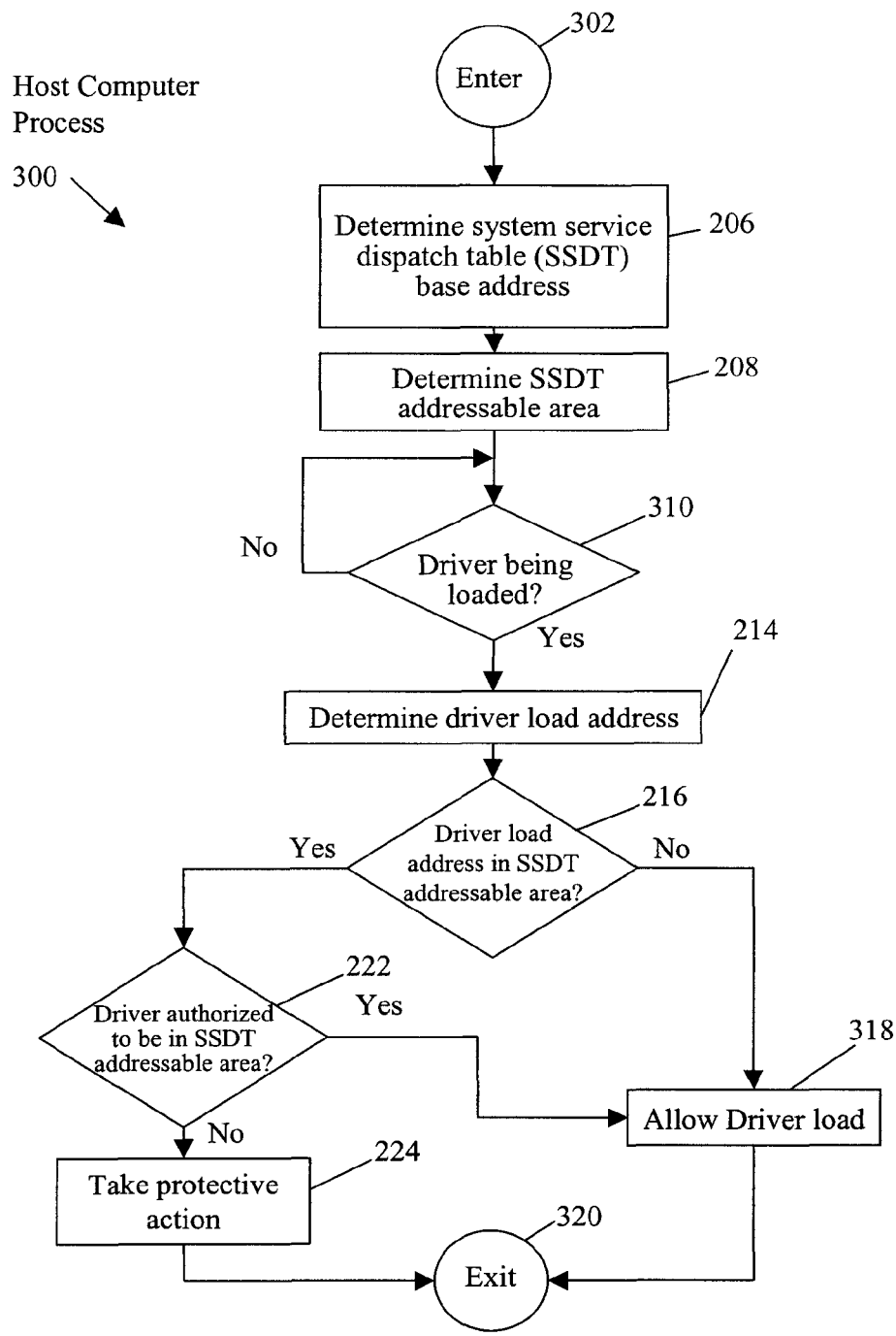
FIG. 3 is a flow diagram of a host computer process in accordance with another embodiment of the present invention.

In accordance with one embodiment, referring to FIGS. 1 and 3 together, a method includes determining a 64-bit driver load address of a driver being loaded in a DETERMINE DRIVER LOAD ADDRESS OPERATION 214. The method further includes determining whether the driver load address is in a system service dispatch table (SSDT) addressable area 115 in a DRIVER LOAD ADDRESS IN SSDT ADDRESSABLE AREA CHECK OPERATION 216. Upon a determination that the driver load address is in SSDT addressable area 115, the method further includes determining whether the driver is authorized to be in SSDT addressable area 115 in a DRIVER AUTHORIZED TO BE IN SSDT ADDRESSABLE AREA CHECK OPERATION 222. If the driver is authorized to be in SSDT addressable area 115, the driver is allowed to load in ALLOW DRIVER LOAD OPERATION 318.

In this event, the driver will be loaded in SSDT addressable area 115. Accordingly, the driver will be addressable by a system service dispatch table 146, and thus can hook operating system functions using system service dispatch table 146. However, as the driver is authorized to be in SSDT addressable area 115, loading of the driver in SSDT addressable area 115 has been certified or otherwise authorized.

Conversely, if the driver is not authorized to be in SSDT addressable area 115, the method includes taking protective action in a TAKE PROTECTIVE ACTION OPERATION 224. Illustratively, the driver is loaded in a SSDT non-addressable area 113. In this manner, the driver will not be addressable by system service dispatch table 146, and thus cannot hook operating system functions using system service dispatch table 146. Accordingly, the integrity of the operating system code and other kernel address space code and data structures are protected from the driver, e.g., an errant, malicious or otherwise unauthorized program.

More particularly, FIG. 1 is a diagram of a client-server system 100 that includes a driver load manager application 106 executing on a host computer system 102, e.g., a first computer system, in accordance with one embodiment of the present invention.

Host computer system 102, sometimes called a client or user device, typically includes a central processing unit (CPU) 108, hereinafter processor 108, an input output (I/O) interface 110, and a memory 114. Host computer system 102 may further include standard devices like a keyboard 116, a mouse 118, a printer 120, and a display device 122, as well as, one or more standard input/output (I/O) devices 123, such as a compact disk (CD) or DVD drive, floppy disk drive, or other digital or waveform port for inputting data to and outputting data from host computer system 102. In one embodiment, driver load manager application 106 is loaded into host computer system 102 via I/O device 123, such as from a CD, DVD or floppy disk containing driver load manager application 106.

In one embodiment, memory 114 includes a page based virtual memory system that uses pages. More particularly, 64-bit Windows operating systems such as Windows® Vista provide a page-based virtual memory management schemes that permit programs to realize a 64-bit virtual memory address space. When the computer system processor is running in virtual memory mode, all addresses are assumed to be virtual addresses and are translated, or mapped, to physical addresses in main memory each time the processor executes a new instruction to access memory.

Conventionally, the virtual memory address space is divided into two parts: a lower user address space, also referred to as user mode address space, available for use by a program; and, a high system address space, also referred to as kernel address space, reserved for use by the operating system. Thus, memory 114 includes a user mode address space 103 and a kernel address space 105.

To protect the integrity of the operating system code and other kernel address space code and data structures from errant or malicious programs and to provide efficient system security (user rights management), 64-bit Windows operating systems separate code executing in the user address space, e.g., user mode, from code executing in the kernel address space, e.g., kernel mode. User mode code typically does not have direct access to kernel mode code and has restricted access to computer system resources and hardware.

To utilize kernel mode code functionalities, such as access to disk drives and network connections, user mode programs utilize system calls that interface between the user mode and kernel mode functions. Further, kernel mode programs, sometimes called drivers, also utilize system calls to utilize other kernel mode code functionalities, such as access to disk drives and network connections.

As a result of a system call, the kernel mode of the operating system uses a System Service Dispatch Table (SSDT), sometimes called a system service table, to locate the system service being called.

The system service dispatch table is a table having entries that are 32-bit values that are used by the operating system to locate and call the selected native operating system function.

It is interesting to note that in 32-bit Windows operating systems, a 32-bit system service dispatch table entry is typically a function address represented as a straight function address pointer to the address of the native operating system function in memory. Thus, in 32-bit Windows operating systems, some applications, such as computer security applications, often hook calls made to operating system functions by replacing the original 32-bit system service dispatch table entry with hooking code, such as a function pointer to alternate code.

For example, an existing 32-bit Windows system service dispatch table entry, which is a straight function address pointer to the address of an operating system function, is retrieved, stored off, and a new function pointer is injected into the system service dispatch table at that location which transfers control to alternate code. Frequently, the alternate code executes a procedure and determines whether to return to the call with an error, or invoke the operating system function.

In 64-bit Windows operating systems, however, a 32-bit system service dispatch table entry in the system service dispatch table does not represent the function address as a straight function address pointer, as the environment is 64-bit based rather than 32-bit based, i.e., a 64-bit straight function address pointer is too large to fit in a 32-bit space. Instead, different from 32-bit Windows operating systems, in 64-bit Windows operating systems, a system service dispatch table entry is a 32-bit encoded value that is used by the operating system to compute a 64-bit function address. Encoded within each 32-bit system service dispatch table entry is the number of stack arguments that need to be copied from the user to the kernel mode stack, herein termed a stack argument count value, and a signed offset to a native operating system function.

In particular in 64-bit Windows operating systems, the lower 4 bits of the 32-bit system service dispatch table entry is the stack argument count value. The remaining upper 28 bits, i.e., bits 4 to 31, represent a signed offset to the function to be called relative to the base address of the system service dispatch table being used.

To compute the address of the function being called in 64-bit Windows operating systems, the signed offset, i.e., bits 4 to 31, (with bits 0-3 being set to zero) is extracted and added to the base address of the system service dispatch table being used.

Accordingly, to be addressable by a system service dispatch table in a 64-bit Windows operating system, the function must be in the 2 GB address space centered at the system service dispatch table. This 2 GB address space centered at the system service dispatch table is herein referred to as the System service dispatch table (SSDT) addressable area. The SSDT addressable area is within the kernel address space. The remaining area of the kernel address space that is outside of the SSDT addressable area is herein referred to as the SSDT non-addressable area.

To illustrate, referring still to FIG. 1, kernel address space 105 is divided into a SSDT non-addressable area 113 and a SSDT addressable area 115. Further, SSDT addressable area 115 is the address space centered at a system service dispatch table (SSDT) 146, that is located within and defines SSDT addressable area 115.

System service dispatch table 146 is located at a system service dispatch table base address 148 (SSDT base address 148), i.e., a 64-bit address, within kernel address space 105. SSDT addressable area 115 is the 2 gigabyte (GB) virtual address space extending between: 1) SSDT base address 148 minus 1 GB; and 2) SSDT base address 148 plus 1 GB. Stated another way, SSDT addressable area 115 is defined by a SSDT addressable area start address offset from SSDT base address 148 by 1 GB and a range of 2 GB.

SSDT non-addressable area 113 is the remaining address space of kernel address space 105 that is not within SSDT addressable area 115. SSDT non-addressable area 113 is not addressable by system service dispatch table 146.

Host computer system 102 is coupled to a server system 130 of client-server system 100 by a network 124. Server system 130 typically includes a display device 132, a processor 134, a memory 136, and a network interface 138.

Network 124 can be any network or network system that is of interest to a user. In various embodiments, network interface 138 and I/O interface 110 include analog modems, digital modems, or a network interface card.

Driver load manager application 106 is stored in memory 114 of host computer system 102 and executed on host computer system 102. In one embodiment, driver load manager application 106 is a kernel mode driver located within SSDT addressable area 115 and/or is part of the operating system. The particular type of and configuration of host computer system 102 and server system 130 are not essential to this embodiment of the present invention.

Figure 2:
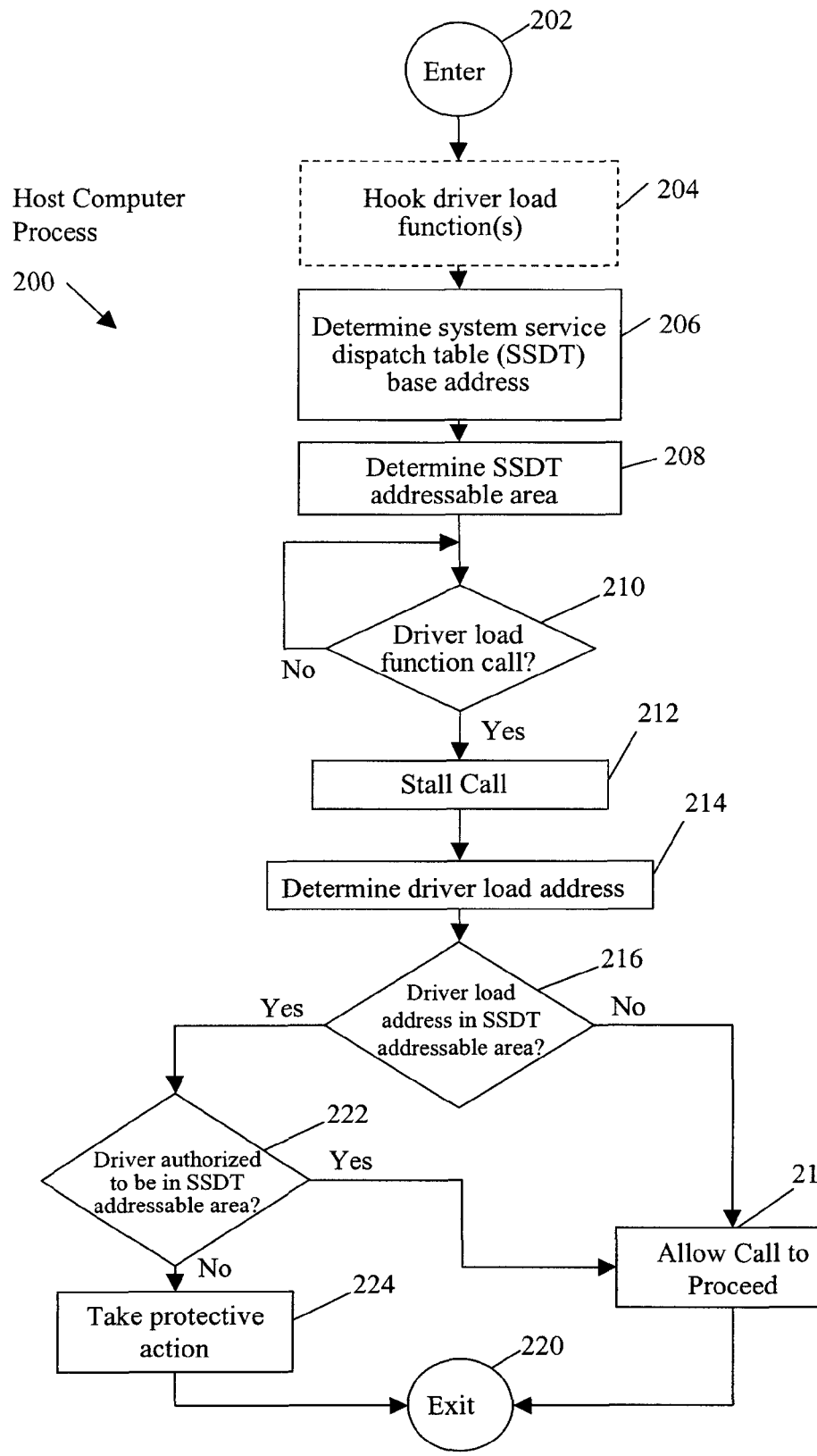
FIG. 2 is a flow diagram of a host computer process in accordance with one embodiment of the present invention.

FIG. 2 is a flow diagram of a host computer process 200 in accordance with one embodiment of the present invention. Referring now to FIGS. 1 and 2 together, execution of driver load manager application 106 by processor 108 results in the operations of host computer process 200 as described below in one embodiment.

From an ENTER OPERATION 202, flow moves to an optional HOOK DRIVER LOAD FUNCTION(S) OPERATION 204. In HOOK DRIVER LOAD FUNCTION(S) OPERATION 204, the driver load functions, e.g., at least one driver load function, of host computer system 102 are hooked. In one embodiment, a system level, e.g., a kernel mode module or kernel mode driver, hooks the driver load functions in kernel mode. Further, in one embodiment, a driver load function is hooked by redirecting driver load function calls to the driver load function, for example, to a hook module in accordance with an embodiment of the present invention. Stated another way, a driver load function is hooked by intercepting driver load function calls to the driver load function. For example, a driver load function is hooked using a method as set forth in commonly assigned Buches, U.S. patent application Ser. No. 11/234,478, filed on Sep. 22, 2005, entitled "FAST SYSTEM CALL HOOKING ON X86-64-bit WINDOWS XP PLATFORMS", which is herein incorporated by reference in its entirety.

In one embodiment, a driver load function is the ZwLoadDriver( ) function that is hooked during HOOK DRIVER LOAD FUNCTION(S) OPERATION 204. In another embodiment, the FltLoadFilter( ) function is hooked during HOOK DRIVER LOAD FUNCTION(S) OPERATION 204. In yet another embodiment, PsLoadImageNotifyRoutine( ) function is used to get notifications of loading of drivers. In yet another embodiment, a mini-filter driver that watches for section creation, i.e., when the driver image is about to be mapped into memory, is used to hook driver load functions.

In another embodiment, driver load manager application 106 is responsible for driver loading or otherwise is inherently notified of driver loading or calls to driver loading functions. To illustrate, driver load manager application 106 is part of the operating system. In accordance with this embodiment, hooking of the driver load functions is unnecessary and not performed. Accordingly, HOOK DRIVER LOAD FUNCTION(S) OPERATION 204 is unnecessary and thus not performed, and so HOOK DRIVER LOAD FUNCTION(S) OPERATION 204 is set forth herein as an optional operation.

From HOOK DRIVER LOAD FUNCTION(S) OPERATION 204 (or directly from ENTER OPERATION 202 if HOOK DRIVER LOAD FUNCTION(S) OPERATION 204 is not performed), flow moves to a DETERMINE SYSTEM SERVICE DISPATCH TABLE (SSDT) BASE ADDRESS OPERATION 206. In DETERMINE SYSTEM SERVICE DISPATCH TABLE (SSDT) BASE ADDRESS OPERATION 206, the SSDT base address of the system service dispatch table is determined.

In one embodiment, the SSDT base address for the system service dispatch table is exported from the Windows kernel (ntoskrnl.exe) as a symbol KeServiceDescriptorTable. The MmGetSystemRoutineAddress( ) function with a parameter of "KeServiceDescriptorTable" is used to get the SSDT base address. However, in other embodiments, other techniques are used to retrieve the SSDT base address.

To illustrate, SSDT base address 148 of system service dispatch table 146 of FIG. 1 is determined in DETERMINE SYSTEM SERVICE DISPATCH TABLE (SSDT) BASE ADDRESS OPERATION 206.

From DETERMINE SYSTEM SERVICE DISPATCH TABLE (SSDT) BASE ADDRESS OPERATION 206, flow moves to a DETERMINE SSDT ADDRESSABLE AREA OPERATION 208. In DETERMINE SSDT ADDRESSABLE AREA OPERATION 208, the SSDT addressable area is determined using the SSDT base address.

As set forth above, the SSDT addressable area is the 2 GB virtual address space extending between: 1) the SSDT base address minus 1 GB; and 2) the SSDT base address plus 1 GB. Accordingly, the SSDT addressable area is determined by subtracting one (1) GB from the SSDT base address to get a SSDT addressable area start address and adding one (1) GB to the SSDT base address to get a SSDT addressable area end address. The SSDT addressable area start address is the particular 64-bit address where the SSDT addressable area starts and the SSDT addressable area end address is the particular 64-bit address where the SSDT addressable area ends. The address space between the SSDT addressable area start address and the SSDT addressable area end address being the SSDT addressable area. With the same result, the SSDT addressable area is determined by subtracting one (1) GB from the SSDT base address to get a SSDT addressable area start address and then defining the range of the SSDT addressable area as 2 GB relative to the SSDT addressable area start address.

To illustrate, SSDT addressable area 115 is determined to be the 2 GB virtual address space extending between: 1) SSDT base address 148 minus 1 GB; and 2) SSDT base address 148 plus 1 GB. Accordingly, SSDT addressable area 115 is determined by subtracting one (1) GB from SSDT base address 148 to get a SSDT addressable area start address 150 and adding one (1) GB to SSDT base address 148 to get a SSDT addressable area end address 152. SSDT addressable area start address 150 is the particular 64-bit address where SSDT addressable area 115 starts and SSDT addressable area end address 152 is the particular 64-bit address where SSDT addressable area ends 115. The address space between SSDT addressable area start address 150 and SSDT addressable area end address 152 being SSDT addressable area 115. With the same result, SSDT addressable area 115 is determined by subtracting one (1) GB from SSDT base address 146 to get SSDT addressable area start address 150 and then defining the range of SSDT addressable area 115 as 2 GB relative to SSDT addressable area start address 150.

From DETERMINE SSDT ADDRESSABLE AREA OPERATION 208, flow moves to a DRIVER LOAD FUNCTION CALL CHECK OPERATION 210. In DRIVER LOAD FUNCTION CALL CHECK OPERATION 210, a determination is made as to whether a driver load function call to a driver load function has been made. If a driver load function call to a driver load function has not been made, flow remains at DRIVER LOAD FUNCTION CALL CHECK OPERATION 210. Conversely, if a driver load function call to a driver load function has been made, flow moves from DRIVER LOAD FUNCTION CALL CHECK OPERATION 210 to a STALL CALL OPERATION 212.

In STALL CALL OPERATION 212, the driver load function call is stalled, i.e., is prevented from reaching the operating system. By stalling the driver load function call, loading of the driver is stalled.

From STALL CALL OPERATION 212, flow moves to a DETERMINE DRIVER LOAD ADDRESS OPERATION 214. In DETERMINE DRIVER LOAD ADDRESS OPERATION 214, the driver load address, i.e., the 64-bit address at which the driver is to be loaded, is determined. More particularly, the address within the kernel address space at which the driver is to be loaded is determined.

In one embodiment, the section creation for mapping of the driver image into memory is intercepted, e.g., using the minifilter driver set forth above. The section address of the section being created is the driver load address.

From DETERMINE DRIVER LOAD ADDRESS OPERATION 214, flow moves to a DRIVER LOAD ADDRESS IN SSDT ADDRESSABLE AREA CHECK OPERATION 216. In DRIVER LOAD ADDRESS IN SSDT ADDRESSABLE AREA CHECK OPERATION 216, a determination is made as to whether the driver load address is in the SSDT addressable area. If the driver load address is not in the SSDT addressable area, flow moves from DRIVER LOAD ADDRESS IN SSDT ADDRESSABLE AREA CHECK OPERATION 216 to an ALLOW CALL TO PROCEED OPERATION 218.

In ALLOW CALL TO PROCEED OPERATION 218, the driver load function call is allowed to proceed. More particularly, the driver load function call is passed to the operating system. As discussed above, the driver load function call was stalled in STALL CALL OPERATION 212. From ALLOW CALL TO PROCEED OPERATION 218, flow moves to and exits at an EXIT OPERATION 220 or returns to DRIVER LOAD FUNCTION CALL CHECK OPERATION 210 and waits for the next driver load function call.

As discussed above, to be addressable by the system service dispatch table, the function must be in the SSDT addressable area. As the driver load address is not within the SSDT addressable area in accordance with this embodiment, the loaded driver will not be in the SSDT addressable area and thus will not be addressable by the system service dispatch table. Accordingly, the loaded driver will not be able to hook operating system functions using the system service dispatch table and thus is allowed to load by allowing the driver load function call to proceed in ALLOW CALL TO PROCEED OPERATION 218.

To illustrate, in one example, a driver is being loaded in SSDT non-addressable area 113. Accordingly, a driver load function call is intercepted in DRIVER LOAD FUNCTION CALL CHECK OPERATION 210 and the driver load function call is stalled in STALL CALL OPERATION 212. The driver load address is determined in DETERMINE DRIVER LOAD ADDRESS OPERATION 214. Upon a determination in DRIVER LOAD ADDRESS IN SSDT ADDRESSABLE AREA CHECK OPERATION 216 that the driver load address is not in SSDT addressable area 115, i.e., is in SSDT non-addressable area 113, the driver load function call is allowed to proceed in ALLOW CALL TO PROCEED OPERATION 218. Accordingly, the driver is loaded in SSDT non-addressable area 113.

Conversely, returning again to DRIVER LOAD ADDRESS IN SSDT ADDRESSABLE AREA CHECK OPERATION 216, if the driver load address is in the SSDT addressable area, flow moves to DRIVER AUTHORIZED TO BE IN SSDT ADDRESSABLE AREA CHECK OPERATION 222. In DRIVER AUTHORIZED TO BE IN SSDT ADDRESSABLE AREA CHECK OPERATION 222, a determination is made as to whether the driver is authorized to be in the SSDT addressable area.

In one embodiment, the driver, sometimes called authorized driver, is authorized to be in the SSDT addressable area when the driver's digital signature contains an attribute indicative that the driver has passed a security certification program. Illustratively, to become an authorized driver within the security certification program, a driver is required to pass a security enhanced Windows hardware qualification lab (WHQL)-type certification testing.

As part of this certification testing, the security certification program requires verification of the driver vendor's identity and credentials. Further, the certification testing tests for robustness and performance of the driver, including penetration and vulnerability testing to verify that the driver is only performing kernel patching in an agreed-upon and supported manner. Upon passing the certification testing, an attribute is included in the driver's digital signature that indicates that the driver has passed the security certification program's requirements, i.e., that the driver is an authorized driver. Conversely, a driver that lacks an attribute in the driver's digital signature that indicates that the driver has passed the security certification program's requirements is an unauthorized driver.

Although one example of an authorized driver is set forth above, in light of this disclosure, those of skill in the art will understand that a driver can be authorized using any one of a number of authorization techniques depending upon the level of security desired. Generally, an authorized driver is a driver that complies with a particular level of security, and the level of security is determined based upon the overall desired security of the computer system.

If the driver is authorized to be in the SSDT addressable area, flow moves from DRIVER AUTHORIZED TO BE IN SSDT ADDRESSABLE AREA CHECK OPERATION 222 to ALLOW CALL TO PROCEED OPERATION 218, which is performed as discussed above. In this event, the driver will be loaded in the SSDT addressable area and thus will be addressable by the system service dispatch table. However, as the driver is authorized to be in the SSDT addressable area, loading of the driver in the SSDT addressable area has been certified or otherwise authorized.

To illustrate, in one example, an authorized driver is being loaded in SSDT addressable area 115. Accordingly, a driver load function call is intercepted in DRIVER LOAD FUNCTION CALL CHECK OPERATION 210 and the driver load function call is stalled in STALL CALL OPERATION 212. The driver load address is determined in DETERMINE DRIVER LOAD ADDRESS OPERATION 214. Upon a determination in DRIVER LOAD ADDRESS IN SSDT ADDRESSABLE AREA CHECK OPERATION 216 that the driver load address is in SSDT addressable area 115, a determination is made in DRIVER AUTHORIZED TO BE IN SSDT ADDRESSABLE AREA CHECK OPERATION 222 that the driver is an authorized driver. Accordingly, the driver load function call is allowed to proceed in ALLOW CALL TO PROCEED OPERATION 218 and the driver is loaded in SSDT addressable area 115.

However, if a determination is made that the driver is not authorized to be in the SSDT addressable area, i.e., that the driver is an un-authorized driver, flow moves from DRIVER AUTHORIZED TO BE IN SSDT ADDRESSABLE AREA CHECK OPERATION 222 to a TAKE PROTECTIVE ACTION OPERATION 224. In TAKE PROTECTIVE ACTION OPERATION 224, protective action is taken to prevent the driver from being loaded within the SSDT addressable area.

In one embodiment, in TAKE PROTECTIVE ACTION OPERATION 224, the un-authorized driver is loaded in the SSDT non-addressable area instead of the SSDT addressable area. In this manner, the un-authorized driver will not be addressable by the system service dispatch table, and thus cannot hook operating system functions using the system service dispatch table. Accordingly, the integrity of the operating system code and other kernel address space code and data structures are protected from the un-authorized driver, e.g., an errant or malicious program.

In another embodiment, in TAKE PROTECTIVE ACTION OPERATION 224, the un-authorized driver is not loaded. Illustratively, the driver load function call is terminated. More particularly, the driver load function call is not passed to the operating system but is terminated. As discussed above, the driver load function call was stalled in STALL CALL OPERATION 212.

By preventing the un-authorized driver from loading, the un-authorized driver, e.g., malicious code, is prevented from damaging, destroying or otherwise exploiting host computer system 102.

To illustrate, in one example, an unauthorized driver is being loaded in SSDT addressable area 115. Accordingly, a driver load function call is intercepted in DRIVER LOAD FUNCTION CALL CHECK OPERATION 210 and the driver load function call is stalled in STALL CALL OPERATION 212. The driver load address is determined in DETERMINE DRIVER LOAD ADDRESS OPERATION 214. Upon a determination in DRIVER LOAD ADDRESS IN SSDT ADDRESSABLE AREA CHECK OPERATION 216 that the driver load address is in SSDT addressable area 115, a determination is made in DRIVER AUTHORIZED TO BE IN SSDT ADDRESSABLE AREA CHECK OPERATION 222 that the driver is an unauthorized driver. Accordingly, protective action is taken in TAKE PROTECTIVE ACTION OPERATION 224. Illustratively, as protective action, the unauthorized driver is loaded in SSDT non-addressable area 113.

From TAKE PROTECTIVE ACTION OPERATION 224, flow moves to and exits at EXIT OPERATION 220 or returns to DRIVER LOAD FUNCTION CALL CHECK OPERATION 210 and waits for the next call to a driver load function.

FIG. 3 is a flow diagram of a host computer process 300 in accordance with another embodiment of the present invention. Referring now to FIGS. 1 and 3 together, execution of driver load manager application 106 by processor 108 results in the operations of host computer process 300 as described below in one embodiment.

Host computer process to 300 of FIG. 3 is similar to host computer process 200 of FIG. 2 and only the significant differences are discussed below. More particularly, in accordance with this embodiment, driver load manager application 106 is responsible for driver loading. To illustrate, driver load manager application 106 is the part of the operating system that handles loading drivers. Accordingly, instead of intercepting driver load function calls as in host computer process 200 of FIG. 2, driver load manager application 106 manages driver loading and thus loads drivers in the SSDT addressable area or the SSDT non-addressable area depending upon whether the driver is an authorized driver or not.

More particularly, host computer process 300 includes DETERMINE SYSTEM SERVICE DISPATCH TABLE (SSDT) BASE ADDRESS OPERATION 206, DETERMINE SSDT ADDRESSABLE AREA OPERATION 208, DETERMINE DRIVER LOAD ADDRESS OPERATION 214, DRIVER LOAD ADDRESS IN SSDT ADDRESSABLE AREA CHECK OPERATION 216, DRIVER AUTHORIZED TO BE IN SSDT ADDRESSABLE AREA CHECK OPERATION 222, and TAKE PROTECTIVE ACTION OPERATION 224 as described above in reference to host computer process 200 of FIG. 2.

From an ENTER OPERATION 302, flow moves through OPERATIONS 206, 208 to a DRIVER BEING LOADED CHECK OPERATION 310. In DRIVER BEING LOADED CHECK OPERATION 310, a determination is made as to whether a driver is being loaded. If a driver is not being loaded, flow remains at DRIVER BEING LOADED CHECK OPERATION 310. Conversely, if a driver is being loaded, e.g., by driver load manager application 106, flow moves from DRIVER BEING LOADED CHECK OPERATION 310 through OPERATION 214 to DRIVER LOAD ADDRESS IN SSDT ADDRESSABLE AREA CHECK OPERATION 216.

In DRIVER LOAD ADDRESS IN SSDT ADDRESSABLE AREA CHECK OPERATION 216, a determination is made as to whether the driver load address is in the SSDT addressable area as set forth above. If the driver load address is not in the SSDT addressable area, flow moves to an ALLOW DRIVER LOAD OPERATION 318, and the driver is loaded in the SSDT non-addressable area, e.g., by driver load manager application 106. From ALLOW DRIVER LOAD OPERATION 318, flow moves to and exits at an EXIT OPERATION 320 or returns to DRIVE BEING LOADED CHECK OPERATION 310 and waits for loading of the next driver.

Conversely, if the driver load address is in the SSDT addressable area, flow moves to DRIVER AUTHORIZED TO BE IN SSDT ADDRESSABLE AREA CHECK OPERATION 222. In DRIVER AUTHORIZED TO BE IN SSDT ADDRESSABLE AREA CHECK OPERATION 222, a determination is made as to whether the driver is authorized to be in the SSDT addressable area.

If the driver is authorized to be in the SSDT addressable area, flow moves from DRIVER AUTHORIZED TO BE IN SSDT ADDRESSABLE AREA CHECK OPERATION 222 to ALLOW DRIVER LOAD OPERATION 318 as set forth above. Conversely, if the driver is not authorized to be in the SSDT addressable area, flow moves from DRIVER AUTHORIZED TO BE IN SSDT ADDRESSABLE AREA CHECK OPERATION 222 to TAKE PROTECTIVE ACTION OPERATION 224, which is performed as discussed above. More particularly, in TAKE PROTECTIVE ACTION OPERATION 224, the driver is loaded in the SSDT non-addressable area, e.g., by driver load manager application 106, or loading of the driver is terminated. From TAKE PROTECTIVE ACTION OPERATION 224, flow moves to and exits at EXIT OPERATION 320 or returns to DRIVE BEING LOADED CHECK OPERATION 310 and awaits loading of the next driver.

Referring again to FIG. 1, driver load manager application 106 is in computer memory 114. As used herein, a computer memory refers to a volatile memory, a non-volatile memory, or a combination of the two.

Although driver load manager application 106 is referred to as an application, this is illustrative only. Driver load manager application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor. In one embodiment, driver load manager application 106 is implemented as a system level, e.g., kernel mode driver.

While embodiments in accordance with the present invention have been described for a client-server configuration, an embodiment of the present invention may be carried out using any suitable hardware configuration and/or means involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code. In another embodiment, a computer program product comprises a tangible medium configured to store computer readable code including CD-ROM discs, DVDs, ROM cards, floppy discs, magnetic tapes, computer hard drives and servers on a network.

As illustrated in FIG. 1, this medium may belong to the computer system itself. However, the medium also may be removed from the computer system. For example, driver load manager application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that can execute the driver load manager functionality in accordance with at least one of the embodiments as described herein. Similarly, in another embodiment, host computer system 102 and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the driver load manager functionality in accordance with one embodiment of present invention can be implemented in a wide variety of computer system configurations. In addition, the driver load manager functionality could be stored as different modules in memories of different devices. For example, driver load manager application 106 could initially be stored in server system 130, and then as necessary, a portion of driver load manager application 106 could be transferred to host computer system 102 and executed on host computer system 102. Consequently, part of the driver load manager functionality would be executed on processor 134 of server system 130, and another part would be executed on processor 108 of host computer system 102. In view of this disclosure, those of skill in the art can implement various embodiments of the present invention in a wide-variety of physical hardware configurations using an operating system and computer programming language of interest to the user.

In yet another embodiment, driver load manager application 106 is stored in memory 136 of server system 130. Driver load manager application 106 is transferred over network 124 to memory 114 in host computer system 102. In this embodiment, network interface 138 and I/O interface 110 would include analog modems, digital modems, or a network interface card. If modems are used, network 124 includes a communications network, and driver load manager application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A system comprising:
   a processor; and
   a memory coupled to the processor, the memory having instructions stored therein which when executed by the processor perform a process comprising:
   determining a 64-bit driver load address of a driver being loaded; and
   determination whether said driver load address is in a system service dispatch table (SSDT) addressable area, wherein upon a determination that said driver load address is in said SSDT addressable area, determining whether said driver is authorized to be in said SSDT addressable area; and
   determining whether a driver load function call to a driver load function has been made, wherein upon a determination that said driver load function call has been made, said method further comprising stalling said driver load function call;
   wherein upon a determination that said driver load address is in said SSDT addressable area and that said driver is authorized to be in said SSDT addressable area, said method further comprising allowing said driver load function call to proceed.

2. The system of claim 1 wherein said SSDT addressable area is defined by a system service dispatch table.

3. The system of claim 2 wherein said system service dispatch table is within said SSDT addressable area.

4. The system of claim 2 wherein said system service dispatch table is located at a system service dispatch table base address, said SSDT addressable area consisting of a 2 gigabyte (GB) virtual address space extending between said SSDT base address minus 1 GB and said SSDT base address plus 1 GB.

5. The system of claim 2 wherein said system service dispatch table comprises a system service dispatch table entry, said system service dispatch table entry consisting of a 32-bit encoded value that is used by an operating system to compute a 64-bit function address.

6. The system of claim 2 wherein said SSDT addressable area is within a kernel address space, a remaining area of said kernel address space outside of said SSDT addressable area being a SSDT non-addressable area.

7. The system of claim 1 further comprising:
   determining a system service dispatch table (SSDT) base address of a system service dispatch table; and
   determining said SSDT addressable area using said SSDT base address.

8. The system of claim 1 wherein upon a determination that said driver is not authorized to be in said SSDT addressable area, said method further comprising taking protective action.

9. The system of claim 8 wherein said taking protective action comprises preventing said driver from being loaded.

10. The system of claim 1 further comprising hooking said driver load function.

11. A computer-program product comprising a nontransitory computer readable medium containing computer program code which when executed by a processor performs a process comprising:
   a driver load manager application for determining a 64-bit driver load address of a driver being loaded; and
   said driver load manager application further for determination whether said driver load address is in a system service dispatch table (SSDT) addressable area, wherein upon a determination that said driver load address is in said SSDT addressable area, said driver load manager application further for determining whether said driver is authorized to be in said SSDT addressable area;

said driver load manager application further for determining whether a driver load function call to a driver load function has been made, wherein upon a determination that said driver load function call has been made, said method further comprising stalling said driver load function call;

wherein upon a determination that said driver load address is in said SSDT addressable area and that said driver is authorized to be in said SSDT addressable area, said method further comprising allowing said driver load function call to proceed.

12. A system comprising:

a processor; and a memory coupled to the processor, the memory having instructions stored therein which when executed by the processor perform a process comprising:

determining a 64-bit driver load address of a driver being loaded; and determination whether said driver load address is in a system service dispatch table (SSDT) addressable area, wherein upon a determination that said driver load address is in said SSDT addressable area, determining whether said driver is authorized to be in said SSDT addressable area; and determining whether a driver load function call to a driver load function has been made, wherein upon a determination that said driver load function call has been made, said method further comprising stalling said driver load function call;

wherein upon a determination that said driver load address is not in said SSDT addressable area, said method further comprising allowing said driver load function call to proceed.

* * * * *